(12) United States Patent (10) Patent No.: US 7,293,068 B2
Katsuragi et al. (45) Date of Patent: Nov. 6, 2007

(54) METHOD AND SYSTEM FOR STORING DUPLICATE DATA

(75) Inventors: Eiju Katsuragi, Tokyo (JP); Toshio Nakano, Tokyo (JP); Yoshinori Okami, Tokyo (JP); Takao Satoh, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 578 days.

(21) Appl. No.: 09/866,226

(22) Filed: May 24, 2001

(65) Prior Publication Data

US 2001/0049749 A1 Dec. 6, 2001

(30) Foreign Application Priority Data

May 25, 2000 (JP) ............................. 2000-154045

(51) Int. Cl.
*G06F 15/16* (2006.01)
(52) U.S. Cl. ...................... 709/217; 709/201; 709/213; 709/214; 709/215; 709/216; 711/162
(58) Field of Classification Search ................ 709/201, 709/213, 214, 215, 216, 217; 711/162
See application file for complete search history.

(56) References Cited

U.S. PATENT DOCUMENTS

| 5,522,037 | A | * | 5/1996 | Kitagawa et al. .............. 714/40 |
| 5,544,347 | A | * | 8/1996 | Yanai et al. .................. 711/162 |
| 5,720,029 | A | * | 2/1998 | Kern et al. ..................... 714/20 |
| 5,765,171 | A | * | 6/1998 | Gehani et al. ................ 707/203 |
| 5,852,724 | A | * | 12/1998 | Glenn et al. ................. 709/229 |
| 5,857,207 | A | | 1/1999 | Lo et al. |
| 5,978,565 | A | * | 11/1999 | Ohran et al. ................... 714/13 |
| 5,987,621 | A | * | 11/1999 | Duso et al. .................. 709/224 |
| 6,157,991 | A | * | 12/2000 | Arnon ......................... 711/161 |
| 6,260,124 | B1 | * | 7/2001 | Crockett et al. ................ 714/6 |
| 6,292,905 | B1 | * | 9/2001 | Wallach et al. ................. 714/4 |
| 6,366,986 | B1 | * | 4/2002 | St. Pierre et al. ........... 711/162 |
| 6,397,229 | B1 | * | 5/2002 | Menon et al. .............. 711/162 |
| 6,438,707 | B1 | * | 8/2002 | Ronstrom ..................... 714/13 |
| 6,523,130 | B1 | * | 2/2003 | Hickman et al. ............... 714/4 |
| 6,535,967 | B1 | * | 3/2003 | Milillo et al. ............... 711/162 |
| 6,611,923 | B1 | * | 8/2003 | Mutalik et al. ............. 709/229 |
| 6,687,849 | B1 | * | 2/2004 | Cherf ............................. 714/5 |

(Continued)

FOREIGN PATENT DOCUMENTS

JP 63-236137 A 10/1988

(Continued)

*Primary Examiner*—Abdullahi Salad
*Assistant Examiner*—Ramy M Osman
(74) *Attorney, Agent, or Firm*—Townsend and Townsend and Crew LLP

(57) ABSTRACT

During recovery of a master system, a mismatch between data in the master system and that in a backup system is obviated quickly to shorten time consumed before resumption of operation of the master system. The backup system controls, as second difference information, update data generated over a substitute operation period between occurrence of a disabled state of the master system and recovery thereof and when the master system is enabled to operate, a range of addition of first difference information inside the master system and the second difference information or only a range of the second difference information is copied to the master system to eliminate the data mismatch.

8 Claims, 6 Drawing Sheets

U.S. PATENT DOCUMENTS 6,694,450 B1 * 2/2004 Kidder et al. .................. 714/13
6,728,896 B1 * 4/2004 Forbes et al. .................. 714/4

FOREIGN PATENT DOCUMENTS

| | | |
|---|---|---|
| JP | 06-290125 | 10/1994 |
| JP | 08-509565 | 10/1996 |
| JP | 09-274573 A | 10/1997 |
| JP | 10-198607 | 7/1998 |
| JP | 2000-010949 A | 1/2000 |
| WO | WO 94/25919 | 11/1994 |

* cited by examiner

FIG.2

| CYL No./HD No. | | 0 | 1 | 2 | 3 | 4 | 5 | 6 | 7 | 8 | 9 | 10 | 11 | 12 | 13 | 14 | UNUSED |
|---|---|---|---|---|---|---|---|---|---|---|---|---|---|---|---|---|---|
| DEV No.0 | 0 | 0 | 1 | 0 | 1 | 1 | 1 | 0 | 1 | 0 | 1 | 0 | 1 | 1 | 1 | 0 | 0 |
| | 1 | 1 | 1 | 1 | 1 | 1 | 1 | 0 | 0 | 0 | 1 | 0 | 0 | 1 | 1 | 0 | 0 |
| | 2 | 0 | 0 | 0 | 1 | 0 | 1 | 0 | 1 | 0 | 1 | 0 | 1 | 1 | 1 | 0 | 0 |
| | ⋮ | | | | | | | | | | | | | | | | |
| | n | 0 | 0 | 0 | 0 | 0 | 1 | 0 | 1 | 0 | 1 | 0 | 0 | 1 | 0 | 0 | 0 |

⋮

| CYL No./HD No. | | 0 | 1 | 2 | 3 | 4 | 5 | 6 | 7 | 8 | 9 | 10 | 11 | 12 | 13 | 14 | UNUSED |
|---|---|---|---|---|---|---|---|---|---|---|---|---|---|---|---|---|---|
| DEV No.m | 0 | 0 | 0 | 0 | 0 | 0 | 0 | 0 | 0 | 0 | 0 | 0 | 0 | 0 | 0 | 0 | 0 |
| | 1 | 0 | 1 | 1 | 1 | 1 | 1 | 1 | 1 | 1 | 0 | 1 | 0 | 1 | 1 | 0 | 0 |
| | 2 | 0 | 1 | 0 | 1 | 1 | 1 | 0 | 1 | 1 | 0 | 1 | 1 | 1 | 1 | 0 | 0 |
| | ⋮ | | | | | | | | | | | | | | | | |
| | n | 1 | 1 | 0 | 1 | 0 | 1 | 1 | 1 | 0 | 1 | 0 | 1 | 1 | 1 | 1 | 0 |

} 180(480)

METHOD AND SYSTEM FOR STORING DUPLICATE DATA

BACKGROUND OF THE INVENTION

1. Field of the Invention

The present invention relates to data duplicating techniques and more particularly, to a technique effectively applicable to a technique of holding data between a plurality of mutually independent information processing systems in duplicate by using an asynchronous or synchronous data copy technique.

2. Description of the Related Art

For example, in users such as banking organs and insurance companies in which a large capacity of data is held and the loss of data seriously affects the execution of business affairs and social life, taking a backup of the data has hitherto been practiced and besides, in recent years, it has been desired by learning a good lesson from natural calamities and accidents that the data be saved in a backup system laid at a remote location.

More particularly, in order to realize preservation of data and guarantee of operation continuity, update data on a master system is copied to a backup system laid at a remote location and in the event that the master system stops operating owing to a disaster or a fault, the operation is switched to the backup system to ensure continuity of operation.

As regards data preservation based on data duplication between remote locations, a technique disclosed in, for example, JP-A-8-509565 is available. According to the disclosed method, data in a master system is reflected, as it is, on a backup system to maintain a "mirror state" and when operation of the master system is disabled, the operation is switched over to the backup system to thereby make resumption of the system operation easier. The method for backup copy to the master system can be classified principally into two kinds of "synchronous type" and "asynchronous type" from the standpoint of the chance to update the data between the master system and the backup system.

In a technique of the synchronous type, when a request for data update is made by a host of the master system, update data is first written to a storage device of the master system and write of the update data to a storage device of the backup system is then carried out; and when receiving a write end notice from the backup system, the storage device of the master system submits a final write end report to the host of the master system, so that synchronization of the data update between the master system and the backup system can always be maintained.

Contrarily, in a technique of the asynchronous type, when a request for data update is made by the host of the master system, a write end report is submitted to the host of the master system at the time that write of update data to the storage device of the master system is completed but for this data update, execution of data update applied to the backup system is delayed, that is, done asynchronously.

In the case of the asynchronous copy type, a temporary difference in data takes place before the data updated in the master system is reflected on the backup system. Accordingly, a state of the data unreflected on the backup system must be managed or controlled. For example, in a method disclosed in JP-A-10-198607, a difference control table indicating the presence or absence of a difference every logical track is provided and update data is copied to the backup system on the basis of the difference.

In the event that the master system is disabled temporarily owing to, for example, a serious disaster while the "mirror state" being maintained normally, the "mirror state" is sustained by virtue of the synchronousness of data update in the "synchronous type". In this case, part of data concerning the final update is not reflected possibly on the remote system depending on the timing but matching does not matter. In the "asynchronous type", however, the update data is reflected asynchronously on the backup system and as a result, a mismatch occurs between the master system and the backup system. In order to recover from the mismatched condition, all of the data in the backup system must be copied to the master system when the master system recovers from the stop state due to a disaster or fault and much time is required for copying a large capacity of data, thus eventually delaying time for the master system to recover.

A method for recovering from the mismatched state is disclosed in, for example, JP-A-6-290125. In the disclosed method, update data is subjected to wait queuing so as to be copied to the backup system in sequence of update, thus maintaining matching. When recovering from a fault, recovery from the mismatched state is made on the basis of a pending write wait queue inside the backup system.

Further, a technique is disclosed in U.S. Pat. No. 5,857,208, according to which in a system for duplicating data between a local system and a remote system, a backup unit such as a magnetic tape device is connected to the remote system, difference data between the local system and the remote system, which difference data is generated when data copy from the local system to the remote system is stopped to copy data to the backup unit at a specified time point, is managed or controlled by a track status provided on the local system side, and after completion of backup by the remote system, the difference data is copied from the local system to the remote system to permit recovery of matching.

SUMMARY OF THE INVENTION

In the event that the master system stops owing to a calamity or a fault, operation must be switched over to the backup system to continue business affairs until the master system recovers. In the case of the asynchronous copy, a difference from the master system (called a first difference) is generated at the time that operation is switched over to the backup system as described above and as business affairs continue with the backup system, data unreflected on the master system representing a second difference is then generated. The amount of the second difference differs depending on time for the master system to recover and the first and second differences may coincide with each other partly or totally. In the method of copying all data of the backup system to the master system for the sake of performing recovery from a mismatched state when the master system recovers, much time is required for recovering from the mismatched state and as a result, time for the master system to recover is delayed.

An object of the invention is to quickly eliminate a mismatch between data of the master system and that of the backup system when the master system recovers so as to shorten time consumed before the master system resumes operation.

Another object of the invention is to shorten time consumed for recovering from a mismatch of data between individual information processing systems that accompanies operation stop and operation resumption of part of the information processing systems, in a data duplicating system that realizes data guarantee and operation continuity guarantee by holding the same data between the plurality of information processing systems.

Still another object of the invention is to shorten time consumed between operation stop and operation resumption of part of information processing systems, in a data duplicating system that realizes data guarantee and operation continuity guarantee by holding the same data between the plurality of information processing systems.

According to the present invention, in a data duplicating method that connects a first information processing system comprised of a first host computer and a first storage device and at least one second information processing system comprised of a second host computer and a second storage device through a data transfer path and holds the same data in duplicate in the first and second information processing systems by copying first update data generated in the first information processing system to the second information processing system, the second information processing system possesses difference control information for identifying second update data generated in the second information processing system that takes over and executes a process of the first information processing system when the first information processing system stops operating, and after resumption of operation of the first information processing system, the second update data is selectively copied to the first information processing system on the basis of the difference control information.

According to the invention, in a data duplicating method that connects a first information processing system comprised of a first host computer and a first storage device and at least one second information processing system comprised of a second host computer and a second storage device through a data transfer path and holds the same data in duplicate in the first and second information processing systems by asynchronously copying first update data generated in the first information processing system to the second information processing system and having, in the first information processing system, first difference control information for identifying the first update data not copied to the second information processing system, the second information processing system possesses second difference control information for identifying second update data generated in the second information processing system that takes over and executes a process of the first information processing system when the first information processing system stops operating, and after resumption of operation of the first information processing system, data in a range specified by the first and second difference control information is selectively copied to the first information processing system.

According to the invention, in a data duplicating system comprising a first information processing system comprised of a first host computer and a first storage device, at least one second information processing system comprised of a second host computer and a second storage device and a data transfer path through which data transfer between the first and second information processing systems is carried out, whereby the data duplicating system holds the same data in duplicate in the first and second information processing systems by copying first update data generated in the first information processing system to the second information processing system through the data transfer path, the second information processing system includes difference control information for identifying second update data generated in the second information processing system while taking over and executing a process of the first information processing system when the first information processing system is disabled to operate, and the function to selectively copy the second update data of the second information processing system to the first information processing system on the basis of the difference control information when the first information processing system is enabled to operate.

According to the invention, in a data duplicating system comprising a first information processing system comprised of a first host computer and a first storage device, at least one second information processing system comprised of a second host computer and a second storage device and a data transfer path through which data transfer between the first and second information processing systems is carried out, whereby the data duplicating system holds the same data in duplicate in the first and second information processing systems by asynchronously copying first update data generated in the first information processing system to the second information processing system through the data transfer path, the first information processing system includes first difference control information for identifying the first update data not copied to the second information processing system, and the second information processing system includes second difference control information for identifying second update data generated in the second information processing system while taking over and executing a process of the first information processing system when the first information processing system is disabled to operate and the function to selectively copy data in a range specified by the first and second difference control information to the first information processing system when the first information processing system is enabled to operate.

More specifically, in an example of data duplicating system comprising a first system comprised of a host computer and a storage device, a plurality of second systems each comprised of a host computer and a storage device and a data transfer path through which data transfer between the first and second systems is carried out, whereby update data applied to the first system is copied asynchronously or synchronously to the second system to duplicate data and the second system is permitted to continue a process when the first system is disabled to operate, the first system has the function to control, as first difference information, a difference generated when the update data applied to the first system is copied to the second system as necessary, and the second system has the function to control, as second difference data, update data applied to the second system that is generated before recovery of the first system from a disabled state following occurrence of the disabled state and to asynchronously copy a range of the first difference information and second difference information or only a range of the second difference information to the first system when the first system is enabled to operate.

BRIEF DESCRIPTION OF THE DRAWINGS

FIG. 2 is a conceptual diagram showing an example of construction of a difference control table used in the information processing system according to an embodiment of the invention.

DETAILED DESCRIPTION OF THE EMBODIMENTS

Embodiments of the present invention will now be described in greater detail with reference to the accompanying drawings.

Embodiment 1

Figure 1:
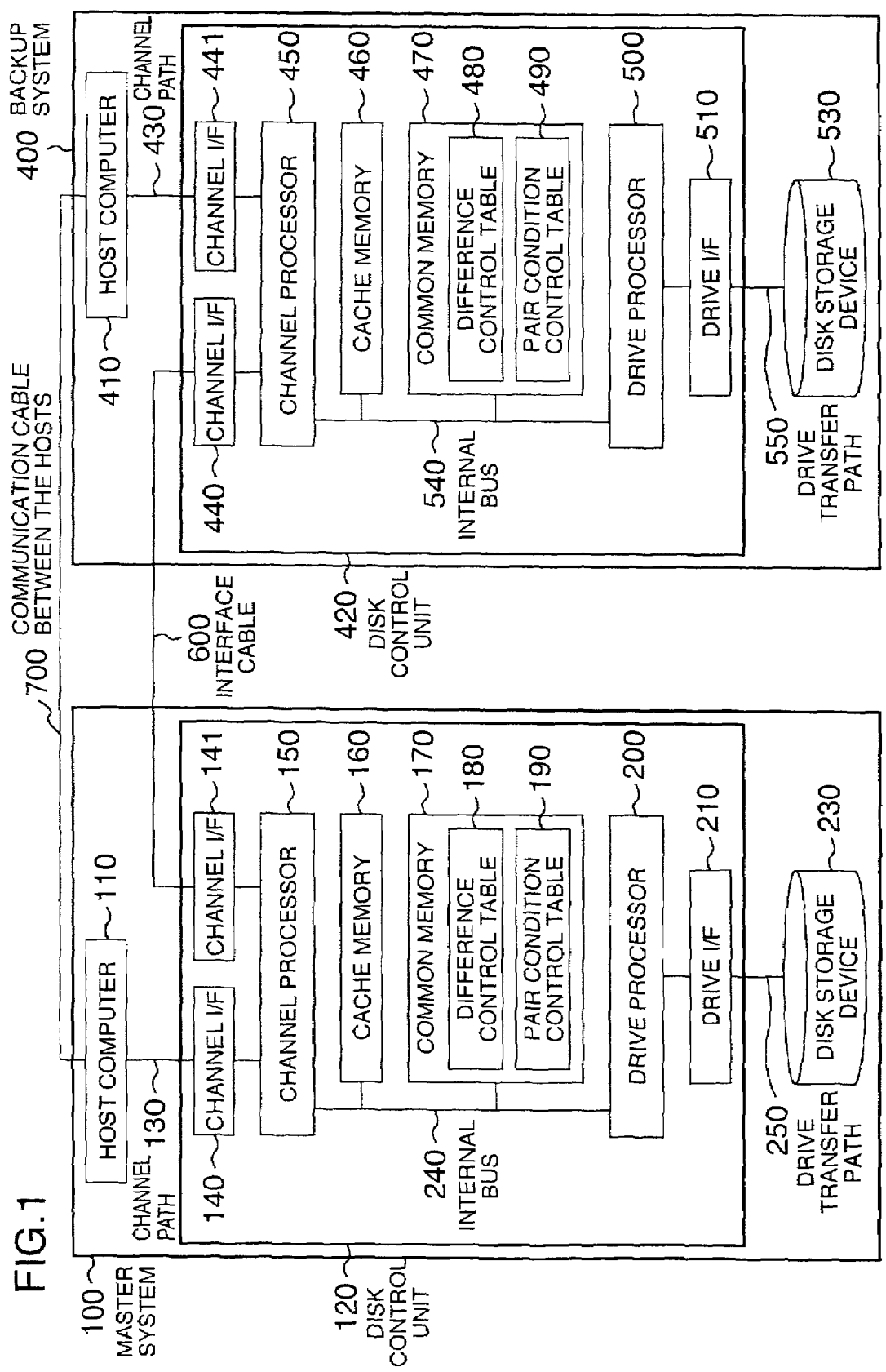
FIG. 1 is a block diagram showing an example of construction of an information processing system exemplifying a data duplicating system adapted to carry out a data duplicating method according to an embodiment of the invention.

FIG. 1 is a block diagram showing an example of construction of an information processing system exemplifying a data duplicating system that practices a data duplicating method according to an embodiment of the invention.

As exemplified in FIG. 1, the information processing system in the present embodiment comprises two systems of master system 100 and backup system 400.

The master system 100 includes a host computer 110, disk control unit 120 and a disk storage device 230. The disk control unit 120 includes channel I/F's 140 and 141, a channel processor 150, a cache memory 160, a common memory 170, an internal bus 240, a drive processor 200 and a drive I/F 210 and is coupled to the host computer 110 through a channel path 130. The disk storage device 230 is coupled to the drive I/F 210 through a drive transfer path 250. The channel processor 150 inside the disk control unit 120 functions during data transmission/reception to/from the host computer 110 and at the time that update data from the host computer 110 is transferred to the backup system 400 by using the channel I/F 141. The drive processor 200 inside the disk control unit 120 functions during data transmission/reception to/from the disk storage device 230 carried out through the drive I/F 210.

A difference control table 180 inside the common memory 170 is updated/referenced by the channel processor 150 so as to be used to control data unreflected on the backup system 400. A pair condition control table 190 inside the common memory 170 is used to control copy condition.

More particularly, when receiving update data from the host computer 110, the disk control unit 120 of the master system 100 according to the present embodiment carries out an asynchronous copy process in which the disk control unit reports write completion to the host computer 110 at the time that a process for writing the update data of interest to the cache memory 160 inside the disk control unit 120 is completed and proceeds with a process for copying the update data of interest to the backup system 400 through the channel I/F 141 and an interface cable 600 at a later arbitrary chance.

The backup system 400 has the construction/function quite similar to that of the master system 100 and includes a host computer 410, a disk control unit 420 and a disk storage device 530, the unit 420 and device 530 being operative under the command of the host computer 410. In the backup system 400, data transmission/reception to/from the master system 100 is carried out through a channel I/F 440 connected to the interface cable 600 and data transmission/reception to/from the host computer 410 is carried out through a channel I/F 441.

In the case of the present embodiment, the disk control unit 420 has a common memory 470 in which a difference control table 480 is provided. The difference control table 480 is updated/referenced by the channel processor 450 through an internal bus 540 and during stop of operation of master system 100 due to, for example, a fault, it controls difference data generated by update data from the host computer 410.

Data transfer between the master system 100 and the backup system 400 is performed through the interface cable 600 and inquiries between the host computers 110 and 410 are made by way of a communication cable 700 between the hosts. In case the backup system 400 is arranged at a remote location, the interface cable 600 and communication cable 700 between the hosts can be implemented with optical fiber, a communication line or an information communication medium such as an electric wave of radio communication that is adapted to connect the two systems.

FIG. 2 is a conceptual diagram showing an example of structure of each of the difference control tables 180 and 480 used in the information processing system according to the present embodiment. In the present embodiment, the I/O (input/output) associated with the host computer 110 and disk control unit 120 and the I/O associated with the host computer 410 and disk control unit 420 are addressed by logical device number (DE No.), logical cylinder number (CL No.) and logical head number (HD No.). The logical device number (DE No.) can take values in the range of from 0 to m, the logical cylinder number (CL No.) can take values in the range of from 0 to n and the logical head number or logical track number (HD No.) can take values of from 0 to 14.

As an example, each of the difference control tables 180 and 480 exemplified in FIG. 2 has a bit map structure and in the logical head number, 0 to 14 is controlled as information of one word (16 bits). To facilitate control, the right end bit is unused. The one word information is put together by (n+1) to indicate a difference state of one logical device and (m+1) logical devices are put together to indicate difference states of all of the devices. Thus, according to the table of FIG. 2, the presence or absence of difference can be controlled in a minimum unit of logical head number or logical track number (HD No.).

FIGS. 3 to 6 are flowcharts showing examples of operation in the information processing system according to the present embodiment. The process flow will be described on the basis of the flowcharts.

Figure 3:
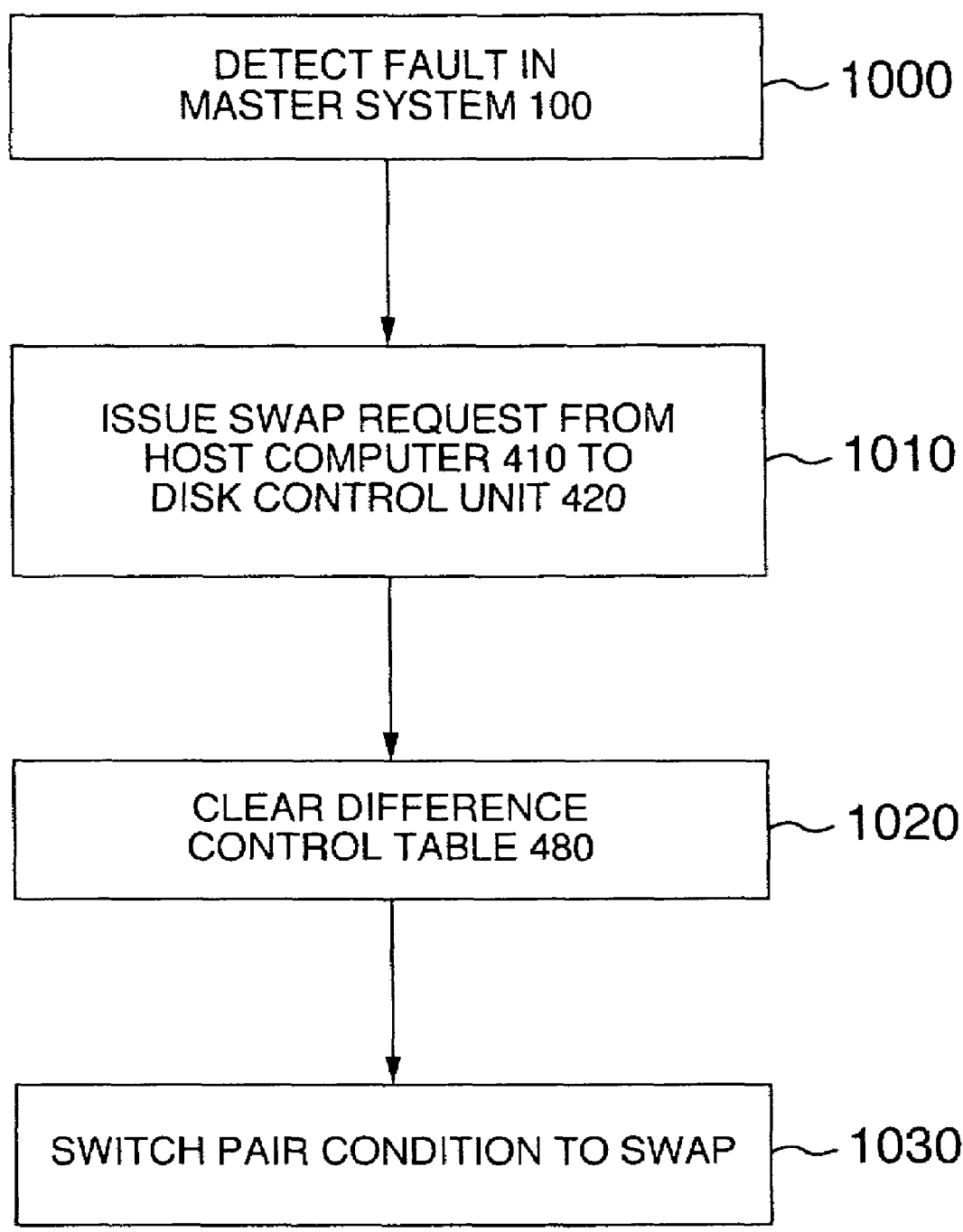
FIG. 3 is a flowchart showing an example of an operation of the information processing system according to the embodiment of the invention.

FIG. 3 shows the flow of processing carried out before the backup system 400 starts degenerative operation when the master system 100 is disabled for processing. Firstly, in step 1000, the host computer 410 detects that the master system 100 is disabled to operate. This can be implemented by, for example, causing the host computer 410 to periodically communicate with the host computer 110 through the communication cable 700 between the hosts so as to check the state. Next, in step 1010, the host computer 410 issues a SWAP request to the disk control unit 420. This SWAP request is for causing the disk control unit 420 normally operating for backup to conduct an operation equivalent to that of the disk control unit 120 inside the master system 100. Receiving the SWAP request, the disk control unit 420 clears the difference control table 480 in step 1020 and stores SWAP as pair condition in the pair condition control table 490 in step 1030. The pair condition represented by SWAP means a state in which while the backup system 400 starts the regenerative operation, the disk control unit 420 controls all of update data from the host computer 410 as difference data and does not perform copying to the master system 100.

Figure 4:
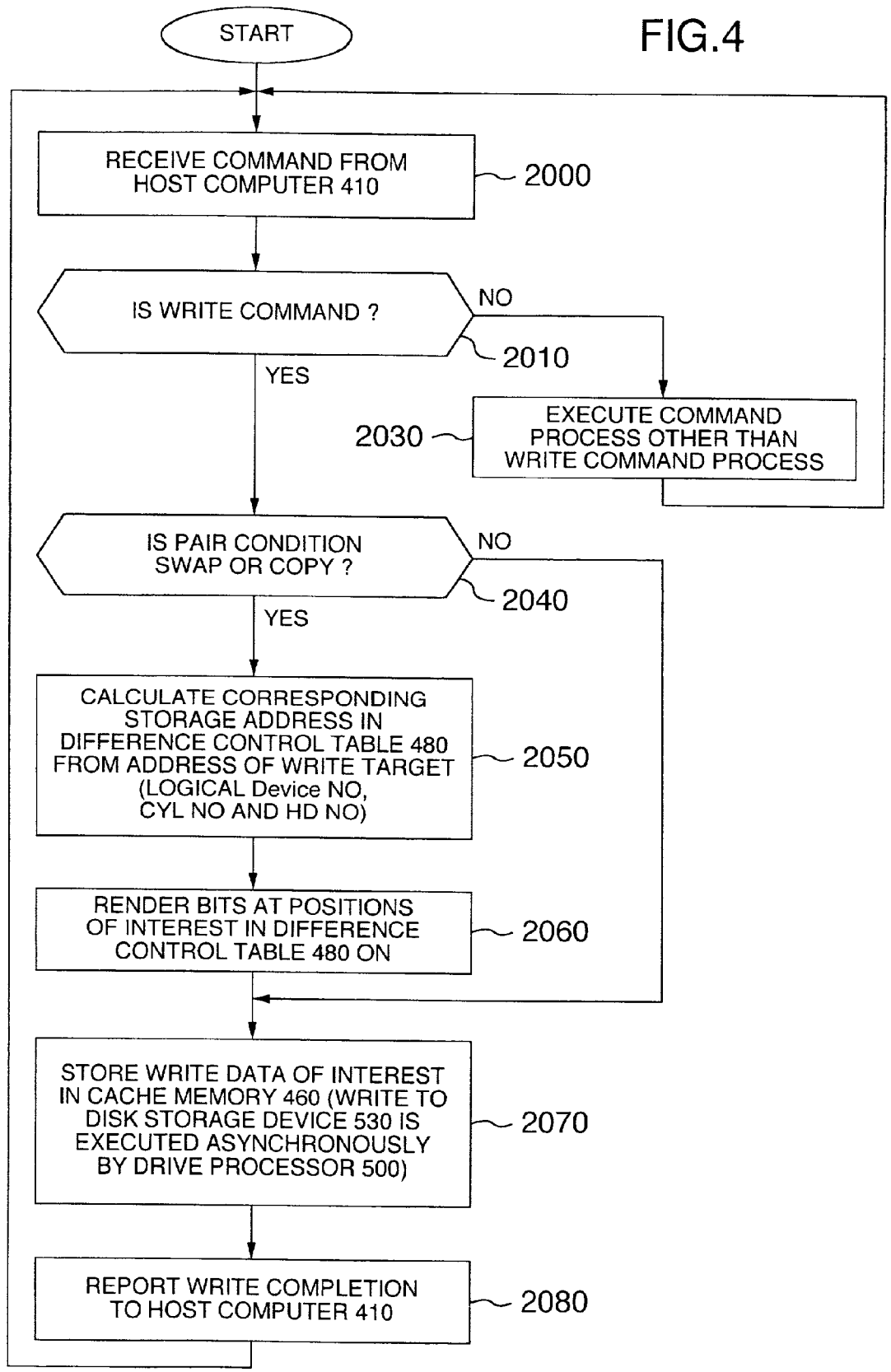
FIG. 4 is a flowchart showing an example of an operation in the information processing system according to the embodiment of the invention.

The flow of process in the disk control unit 420 during the SWAP state will be described with reference to a flowchart of FIG. 4. Firstly, the disk control unit 420 receives a command from the host computer 410. When the command is not determined to be a write command in step 2010, a corresponding command process is carried out in step 2030. If the command is a write command, the pair condition control table 490 is referenced in step 2040. When the pair condition is for SWAP or COPY to be described later, the program proceeds to step 2050. If the pair condition is not for COPY, the program proceeds to step 2070. In the step 2050, an address of the corresponding difference information is calculated from an address of a write target and bits of interest in the difference control table 480 are rendered ON ("1") in step 2060. Subsequently, in the step 2070, the write data of interest is stored in the cache memory 460 and write completion is reported to the host computer 410 in step 2080 to keep the process for write command continuing. It is to be noted that the write data stored in the cache memory 460 is asynchronously stored in the disk storage device 530 by means of the drive processor 500.

Next, operation of the backup system 400 and master system 100 when the master system 100 recovers from the disabled state will be described with reference to flowcharts of FIGS. 5 and 6.

Figure 5:
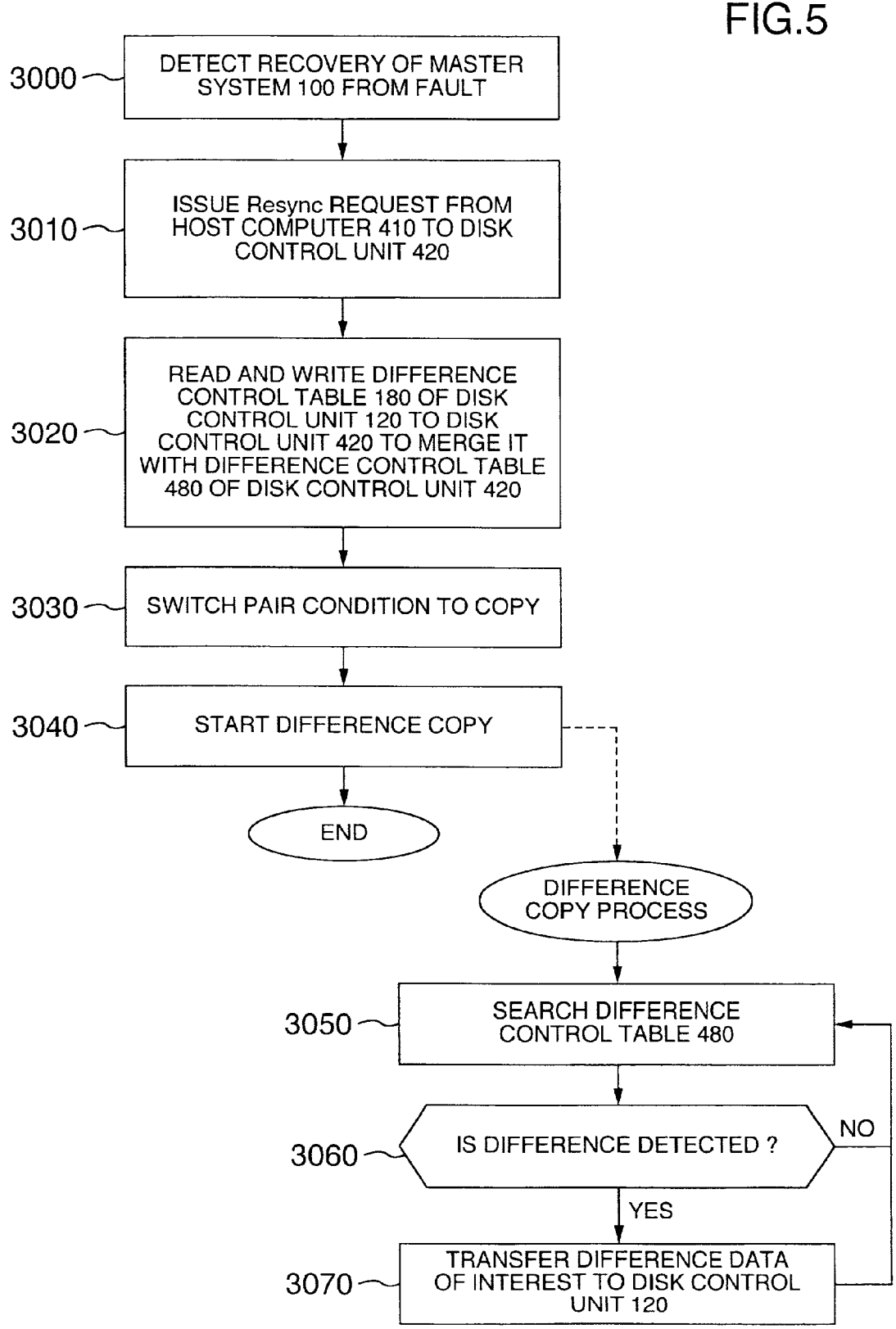
FIG. 5 is a flowchart showing an example of an operation in the information processing system according to the embodiment of the invention.

Firstly, in step 3000 of FIG. 5, the host computer 410 detects that the master system 100 has recovered. This can be implemented by, for example, causing the host computer 410 to periodically check the state of the host computer 110 by using the communication cable 700 between the hosts.

Next, in step 3010, the host computer 410 issues a Resin request to the disk control unit 420. When receiving the Resin request, the disk control unit 420 reads data in the difference control table 180 inside the disk control unit 120 through the interface cable 600 in step 3020. The read data is OR-ed with data in the difference control table 480 and a result of the logical OR operation is stored in the difference control table 480. This newly generated difference information is necessary for maintaining matching between the master system 100 and the backup system 400.

Subsequently, in step 3030, the pair condition in the pair condition control table 490 is changed to COPY. Next, in step 3040, a difference copy process is started. The difference copy process is a JOB executed asynchronously with update data from the host command. In the step 3040, either a difference copy JOB may be started or the difference copy JOB per se may reference the pair condition control table 490 periodically so that copy may be started at a chance that the pair condition changes to COPY.

In the difference copy process, the difference control table 480 is first referenced in step 3050 to search locations where bits are rendered ON. When the locations for bit ON are subsequently found in step 3060, the program proceeds to step 3070 in which the difference data of interest is transferred to the disk control unit 120 and the transferred bits of interest are rendered OFF ("0").

If the locations for bit ON are not found in the step 3060, the program proceeds to step 3050 so that difference search may be executed again.

Figure 6:
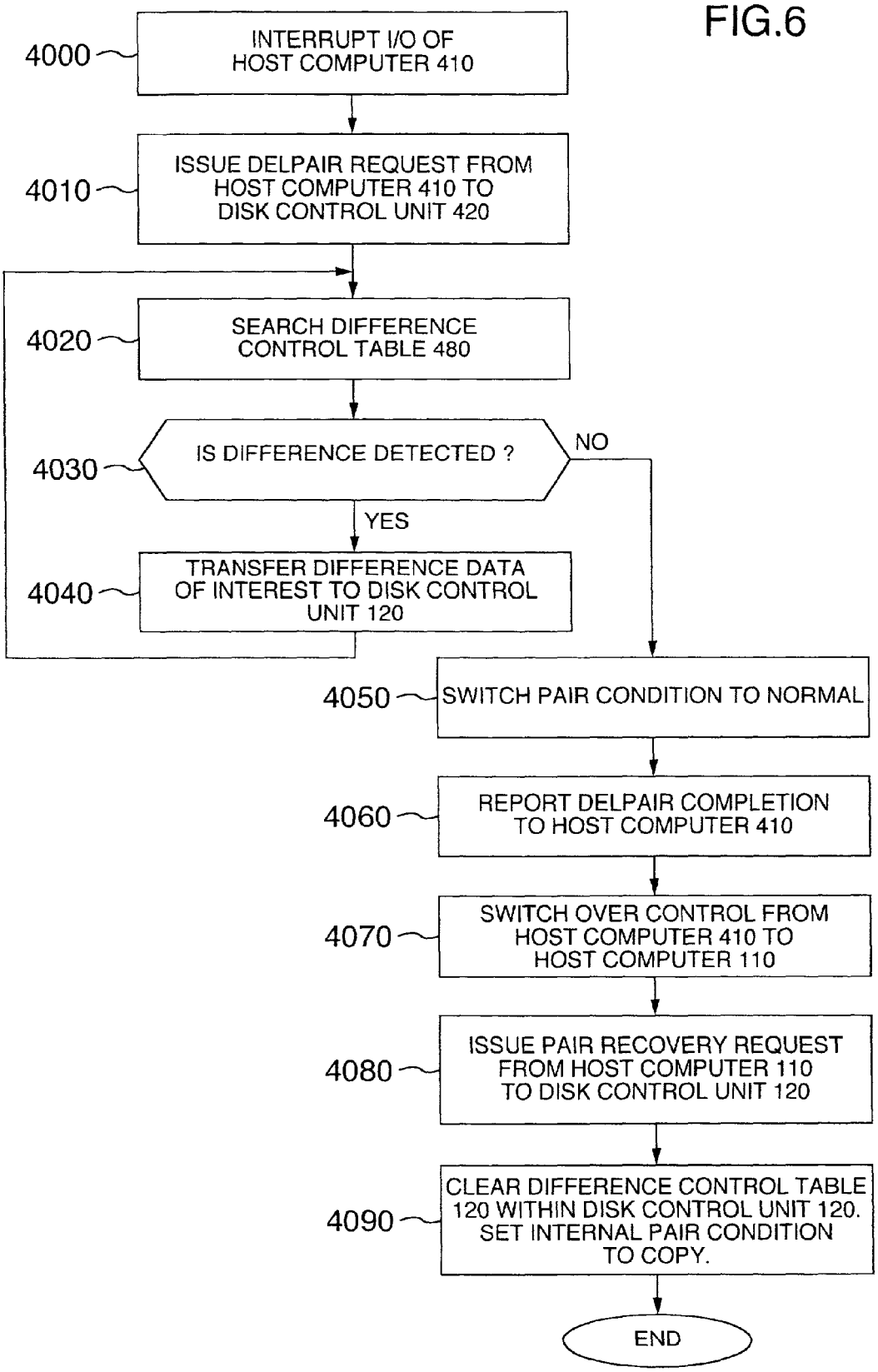
FIG. 6 is a flowchart showing an example of an operation in the information processing system according to the embodiment of the invention.

The flowchart of FIG. 6 shows an example of sequence for again switching over the process in the backup system 400 to the master system 100. Firstly, in step 4000, the host computer 410 stops the I/O. This is necessary because if a new difference is generated during the switchover sequence, matching cannot be guaranteed in respect of this portion. Next, in step 4010, a DELPAIR request issued from the host computer 410 to the disk control unit 420.

When receiving the RELPAIR request, the disk control unit 420 searches a difference by using the difference control table 480 in step 4020 and if difference data is detected in step 4030, transfers the difference data to the disk control unit 120 in step 4040. When the difference data disappears totally, the program proceeds to step 4050 in which the pair condition in the pair condition control table 490 is set to "normal". Next, in step 4060, completion of the DELPAIR is reported to the host computer 410.

In response to the completion report of the DELPAIR request, control is switched over from the host computer 410 to the host computer 110 in step 4070. Next, in step 4080, the host computer 110 issues a pair recovery request to the disk control unit 120. Receiving the pair recovery request, the disk control unit 120 totally clears the difference control table 180 inside the disk control unit 120 in step 4090 and changes the internal state to COPY. Through this, as in the case of the steps 3050 to 3060 in FIG. 5, the difference copy process is started. Since matching of stored data is maintained between the master system 100 and the backup system 400 at that time, copy of all data usually necessary for setting up the pair is unneeded. Through the above process, the master system can recover its state before stop of operation.

According to the data duplicating method and system according to the present embodiment, when the master system 100 recovers from the disabled state due to, for example, a fault so as to be enabled for operation, matching of data between the master system 100 and the backup system 400 can be set up quickly by necessarily minimum data copy from the backup system 400 to the master system 100, thereby ensuring that time consumed before resumption of operation of the master system 100 can be shortened.

Embodiment 2

As a second embodiment of the invention, an instance will be described in which when difference data representing a target of copy from the backup system 400 to the master system 100 is generated during recovery of the master system 100, difference information of the difference control table 180 in the master system 100 is not merged.

Namely, in the second embodiment, the process in step 3020 in FIG. 5 is unneeded. Other steps are the same as those in the first embodiment.

The present embodiment is adapted for the case where update data generated before stop of operation of the master system 100 is considered to be permitted for mismatch (presence of unreflected data) between the master system 100 and the backup system 400 depending on the type of service affairs.

In this case, meritorious effects similar to those in the first embodiment can be obtained and besides, because of unexecuted recovery of difference data based on the difference control table 180 on the side of the master system 100, time required for the copy process of difference data from the backup system 400 to the master system 100 can be shorter than that in the first embodiment.

Embodiment 3

Reverting to FIG. 1, an information processing system according to a third embodiment of the invention will be described in which synchronous copy is carried out from the master system 100 to the backup system 400.

More particularly, in the case of the synchronous copy according to the third embodiment, when receiving update data from the host computer 110, the disk control unit 120 of the master system 100 conducts a process for writing the update data of interest to the cache memory 160 (disk storage device 230) inside the disk control unit 120 and executes a process for copying the update data of interest to the backup system 400 through the channel I/F 141 and interface cable 600. Then, after completion of write of that update data has been confirmed in both the master system 100 and the backup system 400, the disk control unit 120 reports completion of write to the host computer 110 representing the request originator.

Accordingly, in the third embodiment, the difference control table 180 on the side of the master system 100 in FIG. 1 is unneeded. Further, the process in step 3020 of FIG. 5 is unnecessary. Other steps are similar to those in the first embodiment.

In the third embodiment, too, meritorious effects similar to those in the first embodiment can be obtained and besides, because of nonexistence of the difference control table 180 on the side of the master system 100 and nonexistence of recovery of difference data by the difference control table 180, time required for the process of copying the difference data from the backup system 400 to the master system 100 can be shorter than that in the first embodiment.

The invention made by the present inventors has been set forth specifically on the basis of the embodiments of the invention but the present invention is in no way limited to the foregoing embodiments and can be altered in various ways without departing from the gist of the invention.

For example, in contrast to one to one correspondence between the master system and the backup system exemplified in the foregoing embodiments, a plurality of backup systems may be provided.

Advantageously, according to the data duplicating technique of the present invention, when the master system recovers, a mismatch between data in the master system and that in the backup system can be eliminated quickly and time consumed before resumption of operation of the master system can be shortened.

Advantageously, according to the data duplicating technique of the present invention, in the data duplicating system that realizes guarantee of data and operation continuity by holding the same data between a plurality of information processing systems in duplicate, time required for recovery from a mismatch of data between the individual information processing systems accompanying the operation stop and operation resumption of part of the information processing systems can be shortened.

Advantageously, according to the data duplicating technique of the present invention, in the data duplicating system that realizes guarantee of data and operation continuity by holding the same data between a plurality of information processing systems in duplicate, time consumed between operation stop and operation resumption of part of the information processing systems can be shortened.

The present invention can also be applied to a technique of holding data between a plurality of mutually independent information systems in multiple levels more than two.

What is claimed is:

1. A data duplicating method that connects a first information processing system comprised of a first host computer and a first storage device and at least one second information processing system comprised of a second host computer and a second storage device through a data transfer path and copies first update data generated in said first information processing system to said second information processing system, wherein said first information processing system generates first difference control information for identifying any said first update data not copied to the second information processing system, wherein said second information processing system generates second difference control information for identifying second update data generated in said second information processing system after taking over information and data processing performed by said first information processing system when said first information processing system stops operating, and after resumption of operation of said first information processing system, the second information processing system reads the first difference information and executes a logical sum operation on the first difference information and the second difference information managed in the second information processing system, a result of the logical sum operation being reflected in the second difference control information, said second update data being selectively copied to said first information processing system on the basis of said second difference control information in which said logical sum is reflected, wherein said difference control information is a bit map that indicates the presence or absence of completion of data duplication of first and second update data at a plurality of individual units of data storage in each of said first and second storage devices.

2. A data duplicating method that connects a first information processing system comprised of a first host computer and a first storage device and at least one second information processing system comprised of a second host computer and a second storage device through a data transfer path and asynchronously copies first update data generated in said first information processing system to said second information processing system, said first information processing system having first difference control information for identifying said first update data not copied to said second information processing system, wherein said second information processing system creates second difference control information for identifying second update data generated in said second information processing system after taking over information and data processing performed by said first information processing system when said first information processing system stops operating, and after resumption of operation of said first information processing system, the second information processing system reads the first difference information and executes a logical sum operation on the first difference information and the second difference information managed in the second information processing system, a result of the logical sum operation being reflected in the second difference control information, a range of data being selectively copied to said first information processing system based on said second difference control information in which said logical sum is reflected, wherein said first and second difference control information are a bit map that indicates the presence or absence of completion of data duplication of said first and second update data at a plurality of individual unit of data storage in each of said first and second storage devices.

3. A data duplicating method that connects a first information processing system comprised of a first host computer and a first storage device and at least one second information processing system comprised of a second host computer and a second storage device through a data transfer path and asynchronously copies first update data generated in said first information processing system to said second information processing system, said first information processing system having first difference control information for identifying said first update data not copied to said second information processing system, wherein said second information processing system possesses second difference control information for identifying second update data generated in said second information processing system after taking over information and data processing performed by said first information processing system when said first information processing system stops operating, and after resumption of operation of said first information processing system, the second information processing system reads the first difference information and executes a logical sum operation on the first difference information and the second difference information managed in the second information processing system, a result of the logical sum operation being reflected in the second difference control information, said second update data being selectively copied to said first information processing system on the basis of said second difference control information in which said logical sum is reflected, wherein said first and second difference control information are a bit map that indicates the presence or absence of completion of data duplication of said first and second update data at a plurality of individual units of data storage in each of said first and second storage device.

4. A data duplicating method that connects a first information processing system comprised of a first host computer and a first storage device and at least one second information processing system comprised of a second host computer and a second storage device through a data transfer path and synchronously copies first update data generated in said first information processing system to said second information processing system, Wherein said first information processing system generates first difference control information for identifying any said first update data not copied to the second information processing system, wherein said second information processing system generates second difference control information for identifying second update data generated in said second information processing system subsequent to taking over information and data processing performed by said first information processing system when said first information processing system stops operating, and after resumption of operation of said first information processing system, the second information processing system reads the first difference information and executes a logical sum operation on the first difference information and the second difference information managed in the second information processing system, a result of the logical sum operation being reflected in the second difference control operation, said second update data being selectively copied to said first information processing system on the basis of said second difference control information in which said logical sum is reflected, wherein said second difference control information is a bit map that indicates the presence or absence of completion of data duplication at a plurality of individual units of data storage in each of said first and second storage devices.

5. A data duplicating system comprising a first information processing system comprised of a first host computer and a first storage device, at least one second information processing system comprised of a second host computer and a second storage device and a data transfer path through which data transfer between said first and second information processing systems is carried out, whereby said data duplicating system copies first update data generated in said first information processing system to said second information processing system through said data transfer path, wherein said first information processing system generates first difference control information for identifying any said first update data not copied to the second information processing system, wherein said second information processing system creates second difference control information for identifying second update data generated in said second information processing system subsequent to taking over information and data processing performed by said first information processing system when said first information processing system is disabled to operate, and when said first information processing system is enabled to operate, the second information processing system reads the first difference information and executes a logical sum operation on the first difference information and the second difference information managed in the second information processing system, a result of the logical sum operation being reflected in the second difference control information, said second update data being selectively copied to said first information processing system on the basis of said second difference control information in which said logical sum is reflected, wherein said difference control information is a bit map that indicates the presence or absence of completion of duplication of said first and second update data at a plurality of units of data storage in each of said first and second storage devices.

6. A data duplicating system comprising a first information processing system comprised of a first host computer and a first storage device, at least one second information processing system comprised of a second host computer and a second storage device and a data transfer path through which data transfer between said first and second information processing systems is carried out, whereby said data duplicating system asynchronously copies first update data generated in said first information processing system to said second information processing system through said data transfer path, wherein said first information processing system produces first difference control information for identifying said first update data not copied to said second information processing system, and wherein said second information processing system produces second difference control information for identifying second update data generated in said second information processing system subsequent taking over information and data processing system performed by said first information processing system when said first information processing system is disabled to operate, and when said first information processing system is enabled to operate, the second information processing system reads the first difference information and executes a logical sum operation on the first difference information and the second difference information managed in the second information processing system, a result of the logical sum operation being reflected in the second difference control information, a range of data being selectively copied to said first information processing system on the basis of said second difference control information in which said logical sum is reflected, wherein said first and second difference control information are a bit map that indicates the presence or absence of completion of data duplication of said first and second update data at a plurality of units of data storage in each of said first and second storage devices.

7. A data duplicating system comprising a first information processing system comprised of a first host computer and a first storage device, at least one second information processing system comprised of a second host computer and a second storage device and a data transfer path through which data transfer between said first and second information processing systems is carried out, whereby said data duplicating system asynchronously copies first update data generated in said first information processing system to said second information processing system through said data transfer path, wherein said first information processing system includes first difference control information for identifying said first update data not copied to said second information processing system, and wherein said second information processing system includes second difference control information for identifying second update data generated in said second information processing system subsequent to taking over information and data processing performed by said first information processing system when said first information processing system is disabled to operate, and when said first information processing system is enabled to operate, the second information processing system reads the first difference information and executes a logical sum operation on the first difference information and the second difference information managed in the second information processing system, a result of the logical sum operation being reflected in the second difference control information, said second update data being selectively copied to said first information processing system on the basis of said second difference control information in which said logical sum is reflected, wherein said first and second difference control information are a bit map that indicates the presence or absence of completion of data duplication of said first and second update data at a plurality of units of data storage in each of said first and second storage devices.

8. A data duplicating system comprising a first information processing system comprised of a first host computer and a first storage device, at least one second information processing system comprised of a second host computer and a second storage device and a data transfer path through which data transfer between said first and second information processing systems is carried out, whereby said data duplicating system synchronously copies first update data generated in said first information processing system to said second information processing system through said data transfer path, wherein said first information processing system generates first difference control information for identifying any said first update data not copied to the second information processing system, wherein said second information processing system generates second difference control information for identifying second update data generated in said second information processing system subsequent to taking over information and data processing performed by said first information processing system when said first information processing system is disabled to operate, and when said first information system is enabled to operate, the second information processing system reads the first difference information and executes a logical sum operation on the first difference information and the second difference information managed in the second information processing system, a result of the logical sum operation being reflected in the second difference control information, said second update data being selectively copied to said first information processing system on the basis of said second difference control information in which said logical sum is reflected, when said second difference control information is a bit map that indicates the presence or absence of completion of data duplication of said first and second update data at a plurality of units of data storage in each of said first and second storage devices.

* * * * *